(12) United States Patent
Lamesch et al.

(10) Patent No.: US 10,131,255 B2
(45) Date of Patent: Nov. 20, 2018

(54) CAPACITIVE SENSOR CONFIGURED FOR USING HEATING ELEMENT AS ANTENNA ELECTRODE

(71) Applicant: IEE International Electronics & Engineering S.A., Echternach (LU)

(72) Inventors: Laurent Lamesch, Reichlange (LU); Michael Virnich, Korlingen (DE); Michael Puetz, Trier (DE)

(73) Assignee: IEE International Electronics & Engineering S.A., Echternach (LU)

( * ) Notice: Subject to any disclaimer, the term of this patent is extended or adjusted under 35 U.S.C. 154(b) by 108 days.

(21) Appl. No.: 14/653,823

(22) PCT Filed: Dec. 19, 2013

(86) PCT No.: PCT/EP2013/077283
§ 371 (c)(1),
(2) Date: Jun. 18, 2015

(87) PCT Pub. No.: WO2014/096127
PCT Pub. Date: Jun. 26, 2014

(65) Prior Publication Data
US 2015/0345998 A1    Dec. 3, 2015

(30) Foreign Application Priority Data

Dec. 19, 2012    (LU) .......................................... 92116

(51) Int. Cl.
*G01D 5/24*    (2006.01)
*B60N 2/56*    (2006.01)
(Continued)

(52) U.S. Cl.
CPC ....... *B60N 2/5685* (2013.01); *B60H 1/00742* (2013.01); *B60N 2/002* (2013.01); *B60R 21/01552* (2014.10); *G01D 5/24* (2013.01)

(58) Field of Classification Search
CPC . G01D 5/24; B60N 2/002; B60N 2/28; B60R 21/01532; B60R 21/0154; G01V 3/088; H03K 17/955
See application file for complete search history.

(56) References Cited

U.S. PATENT DOCUMENTS

| 6,703,845 B2 | 3/2004 | Stanley et al. |
| 2001/0045733 A1 | 11/2001 | Stanley et al. |

(Continued)

FOREIGN PATENT DOCUMENTS

| EP | 2368772 A1 | 9/2011 | |
| WO | WO 2009098824 A1 * | 8/2009 | ............. H01F 27/38 |

(Continued)

OTHER PUBLICATIONS

International Search Report and Written Opinion dated Apr. 17, 2014 re: Application No. PCT/EP2013/077283.

(Continued)

*Primary Examiner* — Son Le
*Assistant Examiner* — Akm Zakaria
(74) *Attorney, Agent, or Firm* — Reising Ethington P.C.

(57) ABSTRACT

A capacitive sensor configured for connection between a heating element and a heating current supply comprises a common mode choke (CMC) for AC-decoupling the heating element from the heating current supply. The CMC comprises first and second inductively coupled windings, the first winding for connection between a first terminal of the heating current supply and a first terminal of the heating element and the second winding for connection between a second terminal of the heating element and a second terminal of the heating current supply. The capacitive sensor further comprises a control and evaluation circuit for injecting an AC signal into the heating element via a measurement node, measuring a voltage on and/or a current across the (Continued)

measurement node, and to derive an impedance between the heating element and a counter electrode from the measurement. The CMC comprises a third winding inductively coupled with the first and second windings, the third winding being operatively coupled with the measurement node.

12 Claims, 13 Drawing Sheets

(51) Int. Cl.
*B60R 21/015* (2006.01)
*B60H 1/00* (2006.01)
*B60N 2/00* (2006.01)

(56) References Cited

U.S. PATENT DOCUMENTS

| | | | | |
|---|---|---|---|---|
| 2010/0152975 | A1* | 6/2010 | Nakagawa | B60R 21/01532 701/45 |
| 2011/0148648 | A1 | 6/2011 | Fischer et al. | |
| 2012/0041648 | A1* | 2/2012 | Yamaguchi | B60N 2/002 701/49 |
| 2012/0081124 | A1* | 4/2012 | Kimes | G01R 31/3275 324/415 |
| 2013/0092677 | A1* | 4/2013 | Virnich | B60N 2/5685 219/204 |

FOREIGN PATENT DOCUMENTS

| | | |
|---|---|---|
| WO | 2011117237 A1 | 9/2011 |
| WO | 2012080066 A1 | 6/2012 |
| WO | WO 2012080066 A1 * | 6/2012 ............ B60N 2/002 |

OTHER PUBLICATIONS

Joshua Smith et al. "Electric Field Sensing for Graphical Interfaces", Computer Graphics I/O Devices May/Jun. 1998; pp. 54-60.

* cited by examiner

Fig. 6 (Comparative Example)

CAPACITIVE SENSOR CONFIGURED FOR USING HEATING ELEMENT AS ANTENNA ELECTRODE

TECHNICAL FIELD

The present invention generally relates to capacitive sensing, e.g. for detecting the presence or absence of a person on a seat (seat occupancy detection) or the presence or absence of a person's hand on the steering wheel of a car (hands-off or hands-on detection.)

BACKGROUND ART

Capacitive sensors have a wide range of applications, and are among others used for the detection of the presence and/or the position of conductive body in the vicinity of an antenna electrode. As used herein, the term "capacitive sensor" designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode—which may be identical with or different from transmitting antenna electrodes—at which the influence of an object or living being on the electric field is detected.

The technical paper entitled "Electric Field Sensing for Graphical Interfaces" by J. R. Smith, published in Computer Graphics I/O Devices, Issue May/June 1998, pp 54-60 describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", which is alternatively referred to as "coupling mode", an oscillating voltage signal is applied to the transmitting electrode, building up an electric field to a receiving electrode, and the displacement current induced at the receiving electrode is measured. The measured displacement current depends on the body being sensed. In the "transmit mode", the transmit electrode is put in contact with the user's body, which then becomes a transmitter relative to a receiver, either by direct electrical connection or via capacitive coupling.

The capacitive coupling strength may e.g. be determined by applying an alternating voltage signal to an antenna electrode and by measuring the current flowing from that antenna electrode either towards ground (in the loading mode) or into a second antenna electrode (in coupling mode). This current may be measured by a transimpedance amplifier, which is connected to the sensing electrode and which converts the current flowing into the sensing electrode into a voltage proportional to the current.

Capacitive sensors, which use a heating element as antenna electrode are known in the patent literature. US 2011/0148648 A1 discloses a capacitive occupant sensing system for a vehicle seat, using a seat heating element 12 as antenna electrode. FIG. 1 schematically shows an illustration of this prior art. Voltage source 2 represents the power supply for the heater, for example a seat heater control unit. Electronic control module (ECM) 1 is configured as a capacitive measurement circuit. It comprises a common mode choke 5, an AC voltage source 9 and capacitors 6, 7 and 8. Capacitor 8 couples the AC voltage generated by AC voltage source 9 into the node 11. The heating element 12 has complex impedance 13 towards ground. The complex impedance 13 includes a capacitive component as well as a resistive component, which depend on the occupancy state of the vehicle seat. Complex impedance 13 is thus hereinafter also referred to as "unknown impedance" or "impedance to be determined". The capacitor 8 forms together with the unknown impedance 13 a voltage divider. The complex voltage $U_{meas}$ between node 11 and circuit ground 10 can be used to calculate the unknown complex impedance 13. The common mode choke 5 decouples the AC voltage on node 11 from AC ground due to its large impedance. The heating element 12 may at the same time be traversed by the DC current supplied by voltage source 2 and driven with the AC voltage by the capacitive measurement circuit. Capacitors 6 and 7 ensure that a defined AC ground is present on the side of the common mode choke 5 that is connected to the DC power supply of the seat heater. Ground 3 is the reference ground. The connections of the common mode coke 5 are numbered 5.1 through 5.4: connection 5.1 connects the first winding to the high potential side of the voltage source 2; connection 5.2 connects the first winding to the high potential side of the heating element 12; connection 5.3 connects the second winding to the low potential side of the heating element 12 and connection 5.4 connects the second winding to the low potential side of the voltage source 2.

Resistor 4 represents the wiring resistance of the wiring between the low potential side of voltage source 2 and the fourth connection 5.4 of common mode choke 5. There is a similar wiring resistance for the upper wiring between the high potential side of voltage source 2 and common mode choke 5, but this can be neglected for the explanation that follows. Typically, the voltage source 2, which represents the seat heater control unit, is switched on and off periodically to control the heating power of seat heater 12 according to a pulse-width-modulation scheme. A typical switching frequency is 25 Hz, for example. Each time voltage source 2 is switched on, the current through wiring resistance 4 rises from substantially 0 A to the operating current of the seat heater, which is, for example, for a voltage source 2 voltage of 12 V, a seat heater resistance of 1Ω and a wiring resistance of 0.1 Ω equal to about 10.9 A. This current of 10.9 A generates a voltage drop of 1.09 V across wiring resistance 4 each time the voltage source 2 is switched on. This implies that the voltage on the fourth connection 5.4 of the common mode choke 5 will rise to 1.09 V, and consequently also the voltage on node 11 will rise to 1.09 V. The resistance of the second winding of common mode choke 5 is neglected here, but it will also contribute to an additional voltage drop due to its finite conductance. The voltage step of 1.09 V on the sense node may disturb the measurement of the signal voltage on sense node 11, since the step function has a wide frequency bandwidth. The situation is even worse if the seat heater control unit connected to the electronic control module 1 does not interrupt the heating circuit on the high potential side but on the low potential side. This means indeed that the node 11 experiences a voltage drop of about 12 V−1.09 V=10.91 V, which is worse than the 1.09 V step mentioned above. This situation may arise if one type of electronic control module 1 for the capacitive sensing must be usable for different types of seat heater control units e.g. for cost reasons.

U.S. Pat. No. 6,703,845 B2 discloses an occupant sensor for a vehicle seat, wherein the heating element is used either as the sensing electrode or as a driven shield electrode. In some of the described embodiments, the heating element AC-decoupled from the heating current source by inductors. FIG. 2 is a schematic illustration of the occupant sensor of U.S. Pat. No. 6,703,845 B2. The most substantial difference is that the system of U.S. Pat. No. 6,703,845 B2 uses separate inductors 14 and 15 instead of a common mode choke 5. The system of U.S. Pat. No. 6,703,845 B2 suffers from the same disadvantage discussed with respect to FIG. 1. Furthermore, experiments and simulations show that inductors exhibiting the necessary impedance to alternating current below 1 MHz will be so expensive that the solution of U.S. Pat. No. 6,703,845 B2 is unrealistic in an automotive vehicle.

WO2011/117237 discloses an occupancy sensor for a vehicle seat, which measures the complex current flowing into the heating element in response to an AC voltage applied thereto. The circuit configuration is schematically illustrated in FIG. 3. The transimpedance amplifier 17 keeps node 11 at the same AC voltage as the output of AC signal source 9. The reference input 17.1 of the transimpedance amplifier 17 is connected to the AC signal source 9. Transimpedance amplifier 17 converts the current flowing into its signal input 17.2 into a voltage on its output 18, which is indicative of the input current. Since the voltage on node 11 is known, the complex current flowing into the node 11 and, hence, the complex voltage at the output 18 of the transimpedance amplifier is indicative of the complex impedance 13. The capacitive sensing system of FIG. 3 suffers from the same problems as those of FIGS. 1 and 2, when the voltage source 2 of the heating circuit is switched on and off.

BRIEF SUMMARY

The disclosure provides a capacitive sensing system that may use a heating element as antenna electrode, wherein the above-mentioned problem of the heating current steps is mitigated.

The capacitive sensor according to the present invention is configured for being connected between a heating element and a heating current supply and for using the heating element as antenna electrode. The capacitive sensor comprises a common mode choke for AC-decoupling the heating element from the heating current supply. The common mode choke comprises first and second inductively coupled windings, the first winding for being connected between a first terminal (e.g. the high potential side) of the heating current supply and a first terminal (e.g. the high potential side) of the heating element and the second winding for being connected between a second terminal (e.g. the low potential side) of the heating element and a second terminal (e.g. the low potential side) of the heating current supply. The capacitive sensor further comprises a control and evaluation circuit (implemented e.g. as an application-specific integrated circuit) configured to inject an AC signal into the heating element via a measurement node, to measure a voltage on and/or a current across the measurement node, and to derive an impedance between the heating element and a counter electrode from the measured voltage and/or current. The common mode choke comprises a third winding inductively coupled with the first and second windings, the third winding being operatively coupled with the measurement node for inductively injecting the AC signal into the heating element. In other words, the measurement node is operatively connected to the third winding, e.g. by galvanic connection or AC-coupled, so that the AC signal is applied to the third winding and via said third winding inductively injected into the heating element.

The AC signal used for the capacitive sensing may thus be inductively injected into the heating element through the common mode choke, which acts as a transformer. As a consequence, no galvanic connection between the control and evaluation circuit and the heater circuit is required. As will be appreciated by those skilled in the art, when the heating current supply switches on or off, substantially the same step (steep increase or decrease) in heating current will occur in the first and the second winding of the common mode choke but with opposite direction. Therefore, the magnetic fields generated in the core of the common mode choke by the first and second windings substantially cancel each other out. The net magnetic flux thus remains substantially constant, such that the voltage on the measurement node does not change substantially.

Preferably, the common mode choke comprises a first connection for DC-coupling the first winding to the first terminal of the heating current supply, a second connection for DC-coupling the first winding to the first terminal of the heating element, a third connection for DC-coupling the second winding to the second terminal of the heating element and a fourth connection for DC-coupling the second winding to the second terminal of the heating current supply, at least one of the first and fourth connections being AC-coupled (e.g. by means of a coupling capacitor) to a ground conductor. Preferably, the first and fourth connections are both AC-coupled to ground, e.g. by a first coupling capacitor between ground and one of the first and fourth connections and by a second coupling capacitor between ground and the other of the first and fourth connections or between the first and fourth connections or between the second and third connections. The AC coupling to ground guarantees that the AC potential on the first and fourth connections of the common mode choke are on a defined AC potential, irrespective of the precise configuration of the heating current supply.

According to a first possible variant of the invention, the control and evaluation circuit comprises an oscillator coupled to the measurement node via an impedor. As used herein, the term "impedor" designates a capacitor, a resistor, an inductor or a combination of two or more of these components. Those skilled will appreciate that the impedor appears in series with the impedance to be measured, which results in a voltage divider configuration. The unknown impedance may thus be derived from measurements of the voltage on the measurement node. Accordingly, the control and evaluation circuit is preferably configured to measure the voltage on the measurement node and to derive the impedance between the heating element and a counter electrode (typically on ground potential) from the measured voltage. It is worthwhile noting that a current source could be used instead of a voltage source and an impedor.

According to a second possible variant of the invention, the control and evaluation circuit comprises an oscillator and a transimpedance amplifier having a reference input, a current signal input and an output, the current signal input being AC-coupled to the measurement node and the oscillator being operatively connected to the reference input for applying an alternating voltage thereto as the AC signal. The transimpedance amplifier is configured to drive a current into the current signal input such that the voltage difference between the reference input and the current signal input is substantially cancelled and to output a voltage on the output indicative of the current. The ratio of the voltage on the output to the voltage of the oscillator thus indicates the impedance between the heating element and ground.

Preferably, the capacitive sensor comprises a bulk current protection network for protecting the control and evaluation circuit against bulk current injection (BCI). The bulk current protection network preferably includes a first bulk current protection capacitor connected between the reference input and a ground conductor and a second bulk current protection capacitor connected between the reference input and a connection of the first or second winding provided for being connected with the heating element. The so-called BCI test is used in the automotive industry and simulates the influence of electromagnetic fields on the behavior or electronic appliances integrated in cars. The BCI test comprises the injection of a high-frequency current into the wiring of the appliance under test using a so-called current clamp. To pass the test, the appliance must not (significantly) deviate from its intended behavior.

According to a preferred embodiment of the invention, the third winding has a number of turns equal to a number of turns of the first winding and the second winding, respectively. As a consequence, the AC signal arriving in the heating element thanks to the inductive coupling will have substantially the same amplitude as the original AC signal in the measurement node. There may be a phase reversal between these signals depending on the sense of winding of the third winding and the direction of connection but any phase reversal may be corrected or compensated for by the control and evaluation circuit.

If 1-to-1 transformation between the third winding and each of the first and second windings is not required, the third winding may have a number of turns different from a number of turns of the first winding and the second winding, respectively.

Preferably, the capacitive sensor comprises a shielded cable with a first core conductor connected to the first winding for connecting the first winding to the first terminal of the heating element, a second core conductor connected to the second winding for connecting the second winding to the second terminal of the heating element, and a shield conductor surrounding the first and second core conductors, the shield conductor being connected to the control and evaluation circuit. The control and evaluation circuit is preferably configured to maintain the shield conductor at a same AC potential as the first and second core conductors during the measurement of the unknown impedance. It should be noted that the control and evaluation circuit might be configured to operate in different modes (e.g. for calibration.) When operating in a mode different from the measurement mode, the control and evaluation circuit may keep the shield conductor at a different potential, e.g. at a floating potential.

During the measurement of the unknown impedance (measurement mode), the shield conductor may be operatively connected to the oscillator via an amplifier and/or a transformer, the amplifier and/or transformer having a gain corresponding to the ratio of the number of turns of the first or second winding to the number of turns of the third winding. This configuration is especially useful if the number of turns of the third winding is not equal to the number of turns of the first or the second winding.

A preferred aspect of the present invention relates to an occupant sensor for a vehicle seat comprising a capacitive sensor as described hereinabove.

Another preferred aspect of the present invention relates to a hands-on or hands-off detector for a steering wheel, comprising a capacitive sensor as described hereinabove.

BRIEF DESCRIPTION OF THE DRAWINGS

Preferred embodiments of the invention will now be described, by way of example, with reference to the accompanying drawings in which.

DESCRIPTION OF PREFERRED EMBODIMENTS

Figure 1:
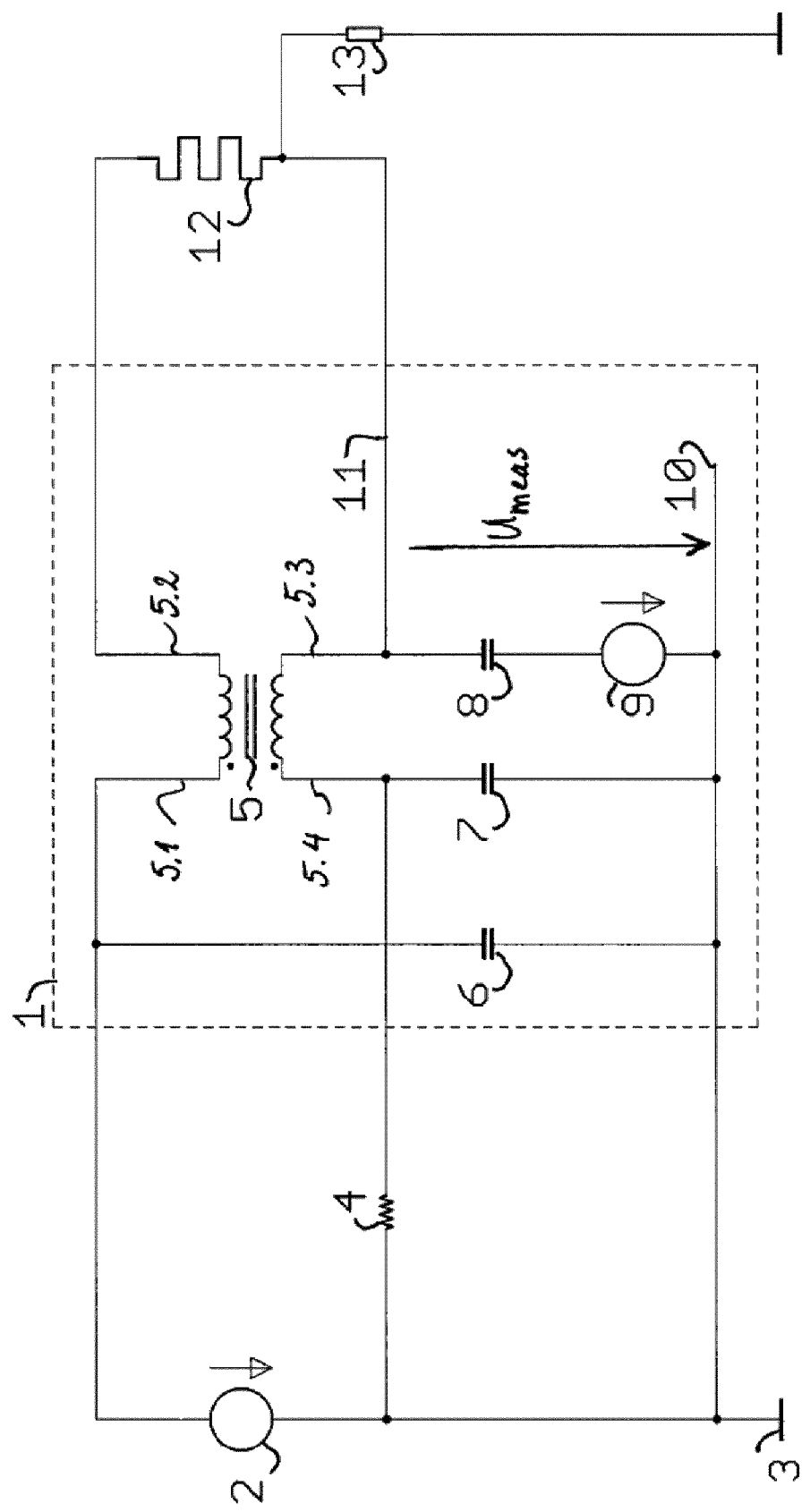
FIG. 1 is a schematic circuit diagram of a first combined heating and capacitive sensing system according to related art.
Figure 2:
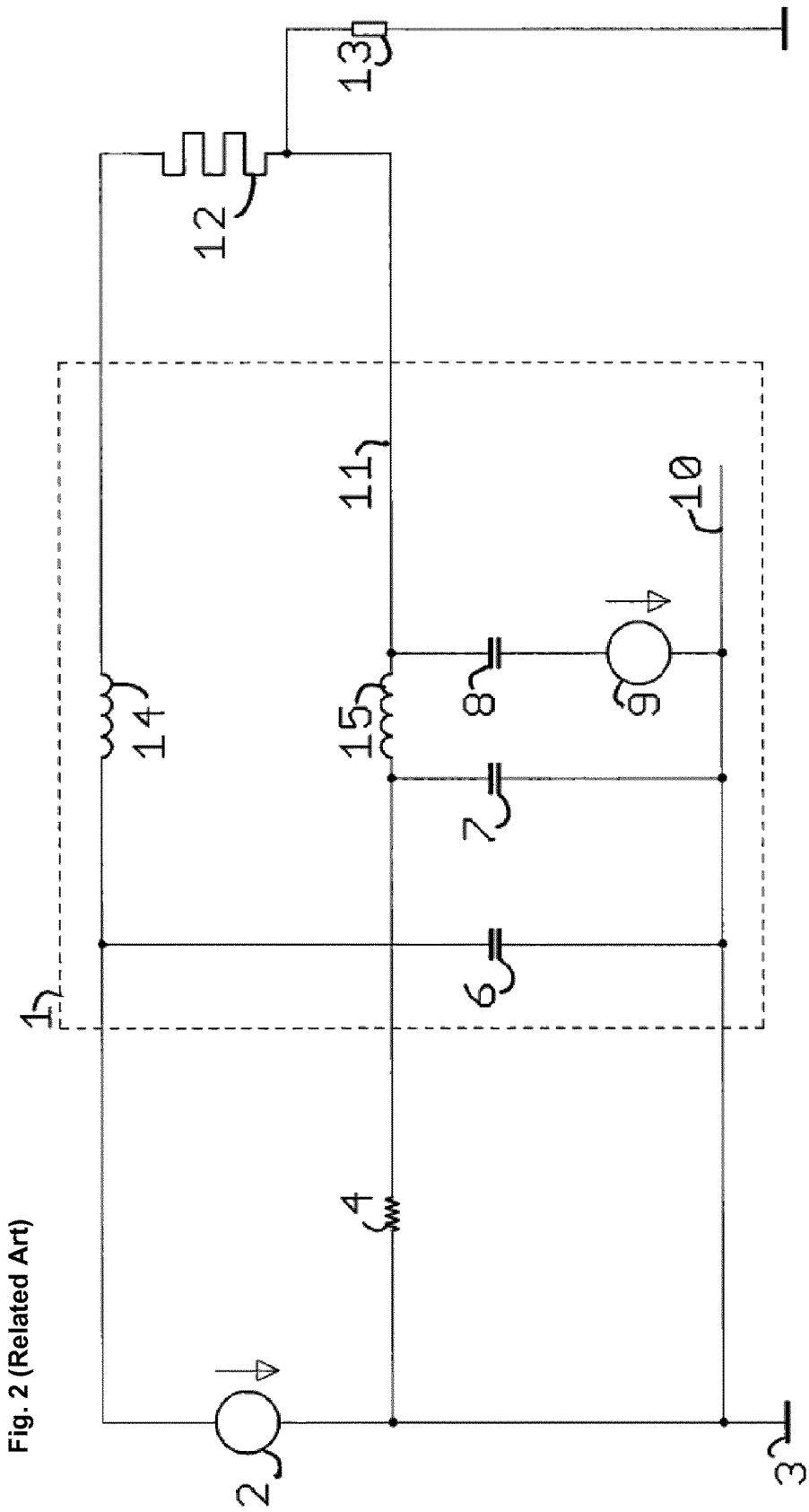
FIG. 2 is a schematic circuit diagram of a second combined heating and capacitive sensing system according to related art.
Figure 4:
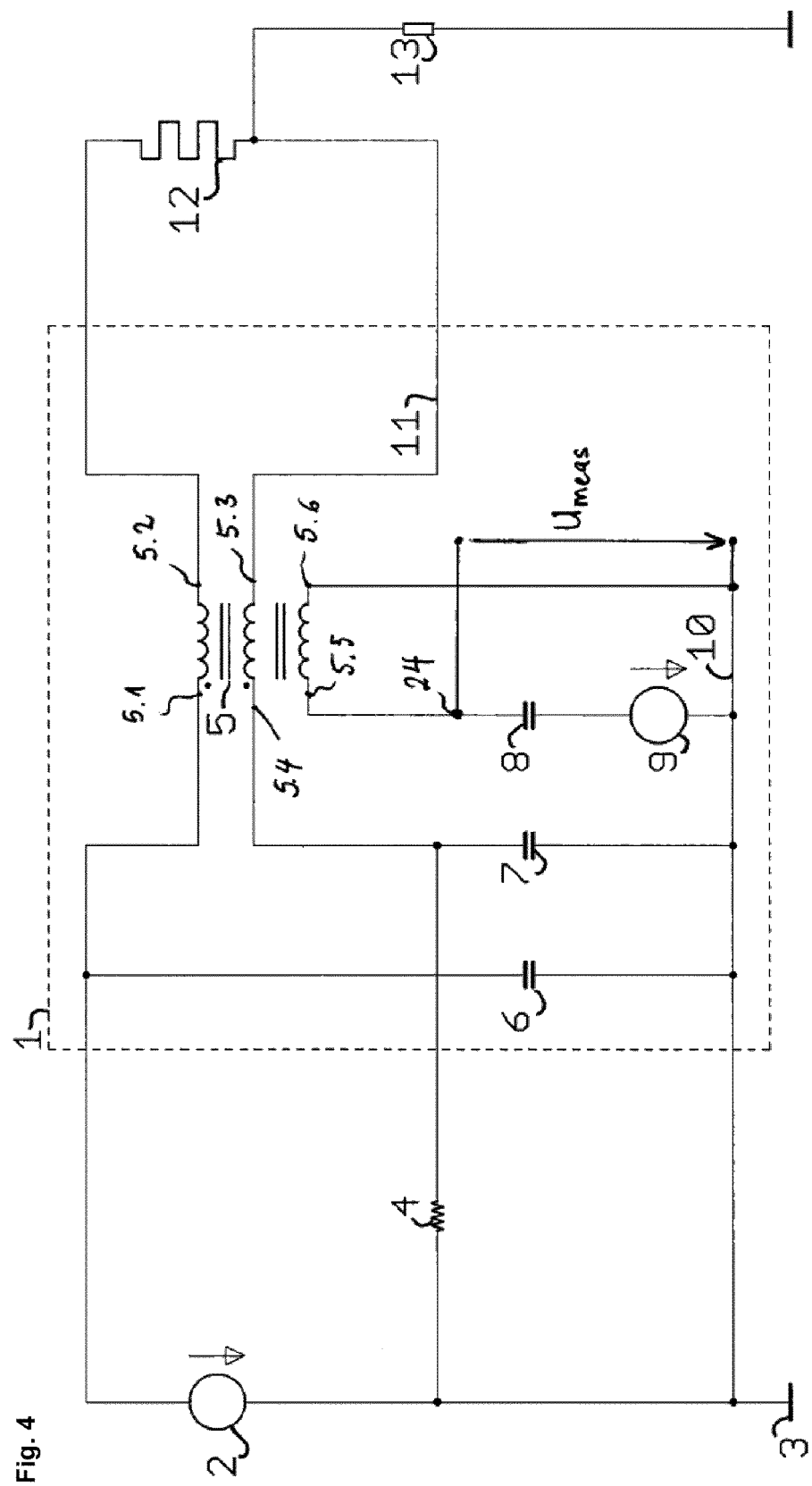
FIG. 4 is a schematic circuit diagram of a combined heating and capacitive sensing system according to a first preferred embodiment of the invention.

FIG. 4 schematically illustrates a combined heater and capacitive sensor, e.g. for a car seat or a steering wheel, according to a first preferred embodiment of the invention. The system comprises a heating circuit that includes a heating current supply, represented in FIG. 4 as DC voltage source 2 and a heating element 12, which produces heat when traversed by current. The system also comprises a capacitive sensor, represented as an electronic control module (ECM) 1. The capacitive sensor comprises a common mode choke 5, an AC voltage source 9 and capacitors 6, 7 and 8. Capacitor 8 couples the AC voltage generated by AC voltage source 9 into the measurement node 24. Capacitors 6 and 7 ensure that a defined AC ground is present on the side of the common mode choke 5 that is connected to the DC power supply of the seat heater. Ground 3 is the reference ground. The connections of the common mode coke 5 that are part of the heating circuit are numbered 5.1 through 5.4 as in FIG. 1: connection 5.1 connects the first winding to the high potential side of the voltage source 2; connection 5.2 connects the first winding to the high potential side of the heating element 12; connection 5.3 connects the second winding to the low potential side of the heating element 12 and connection 5.4 connects the second winding to the low potential side of the voltage source 2. The common mode choke 5 comprises a third winding with connections 5.5. and 5.6 of the common mode choke 5. AC signal source 9 couples an AC voltage through capacitor 8 into the third winding of common mode choke 5. Assuming that the numbers of turns of all three windings are equal, through the transformer action of the 3-winding common mode choke, the same AC voltage as on node 24 also appears on node 11, as the connections 5.1 and 5.4 of common mode choke 5 are connected to AC ground via capacitors 6 and 7. There is possibly a phase reversal between the voltages on nodes 19 and 11, depending on the sense of winding and the direction of connection of the third winding relative to the first and second windings. This is, however, uncritical, as any phase reversal can be corrected by the control and evaluation circuit, e.g. in the measurement evaluation software. The fact that the sense of winding and the direction of connection of the third winding are not important is indicated by the missing winding start dot next to the third winding. (According to the dot convention, when the current increases in the direction from the dot to the respective winding, then positive voltage is induced at the dots of all the coupled windings). Since the relationship between the AC voltages on nodes 11 and 24 is known, it may be assumed for the remainder of the explanations in relation with FIG. 4 that these voltages are the same. The control and evaluation circuit thus works analogously to the circuit in FIG. 1. In particular the capacitor 8 and the unknown impedance 13 form together a voltage divider and the complex AC voltage on node 24 is thus indicative of the complex impedance 13. To determine the complex impedance 13 using the voltage on node 24, the measurement principle of EP 2 368 771, which is herewith incorporated by reference in its entirety with effect for the jurisdictions permitting incorporation by reference, may be used.

The advantage of the capacitive sensor of FIG. 4 is that any voltage step resulting from the switching of the heating current supply on the node 11 does not substantially influence the measured signal on node 24 anymore. Indeed, there is no galvanic connection between nodes 24 and 11. Whenever the voltage source 2 switches on, the resulting current step through the first winding of common mode choke 5 is substantially equal to the current step through the second winding of common mode choke 5 but of opposite direction as both windings are connected in series but in reverse order. Therefore, the magnetic fields generated by the first and second windings substantially cancel each other in the core of the common mode choke. It follows that the change of magnetic flux seen by the third winding is substantially zero and that the voltage on node 24 is thus not affected.

Figure 3:
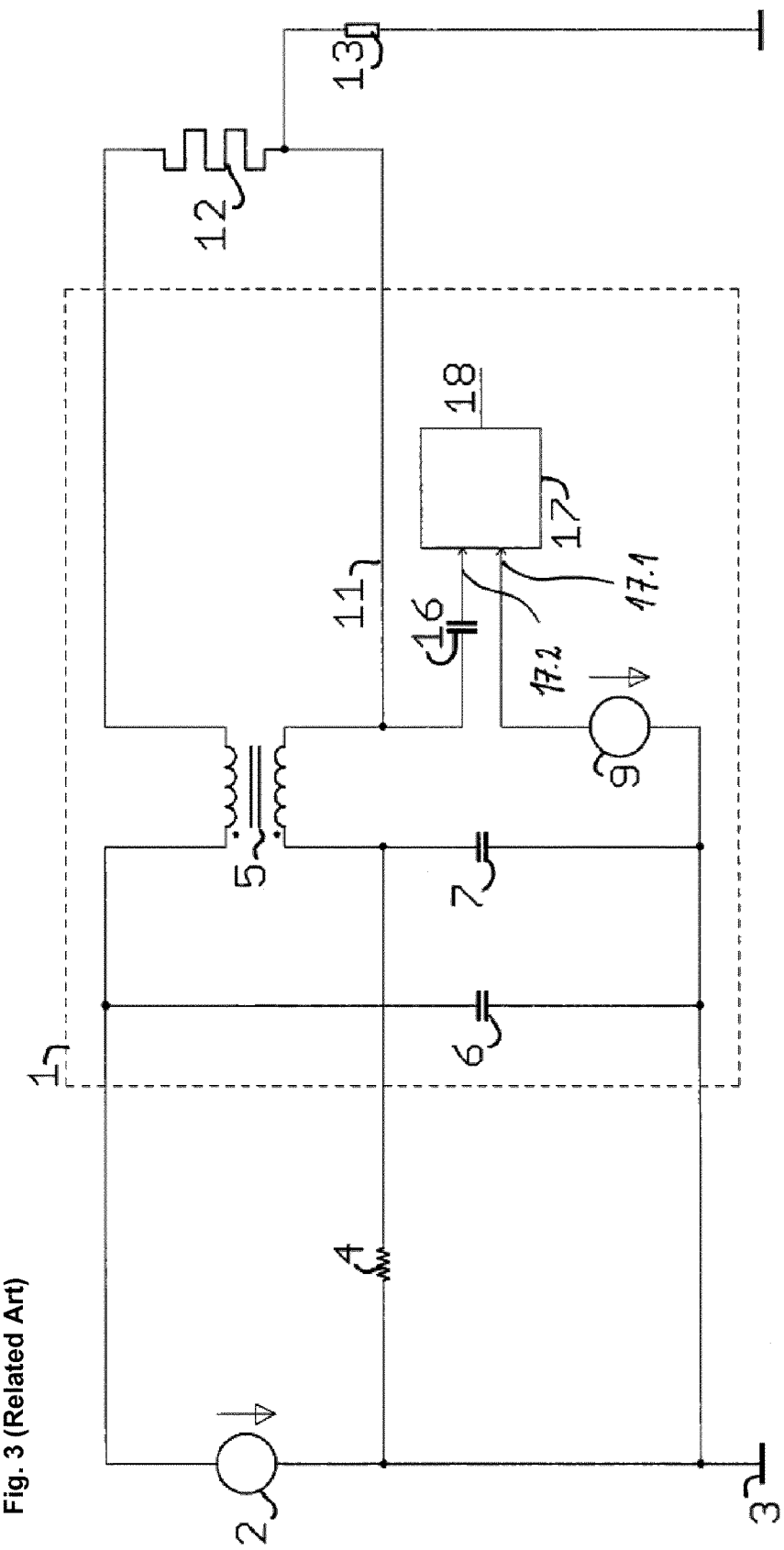
FIG. 3 is a schematic circuit diagram of a third combined heating and capacitive sensing system according to related art.
Figure 5:
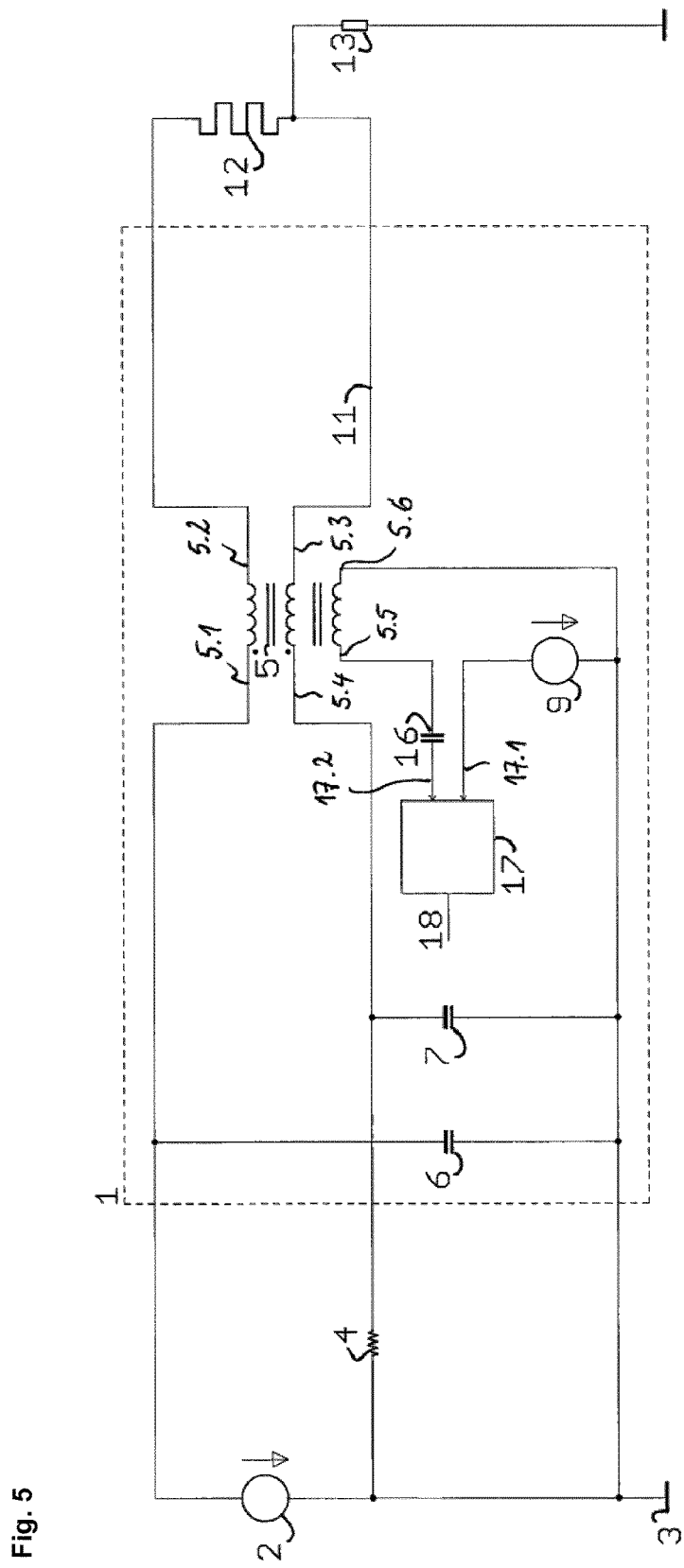
FIG. 5 is a schematic circuit diagram of a combined heating and capacitive sensing system according to a second preferred embodiment of the invention.

FIG. 5 shows a second embodiment of a combined heater and capacitive sensor in accordance with the invention. The capacitive sensor 1 uses basically the same measurement principle as the capacitive sensor of FIG. 3. However, the measurement node (signal input 17.2 of transimpedance amplifier 17) is inductively coupled to the node 11 and thus to the heating element 12 via the third winding of the common mode choke 5. The advantages of the galvanic separation between the measurement node and the heating element are those explained already with respect to FIG. 4.

Figure 6:
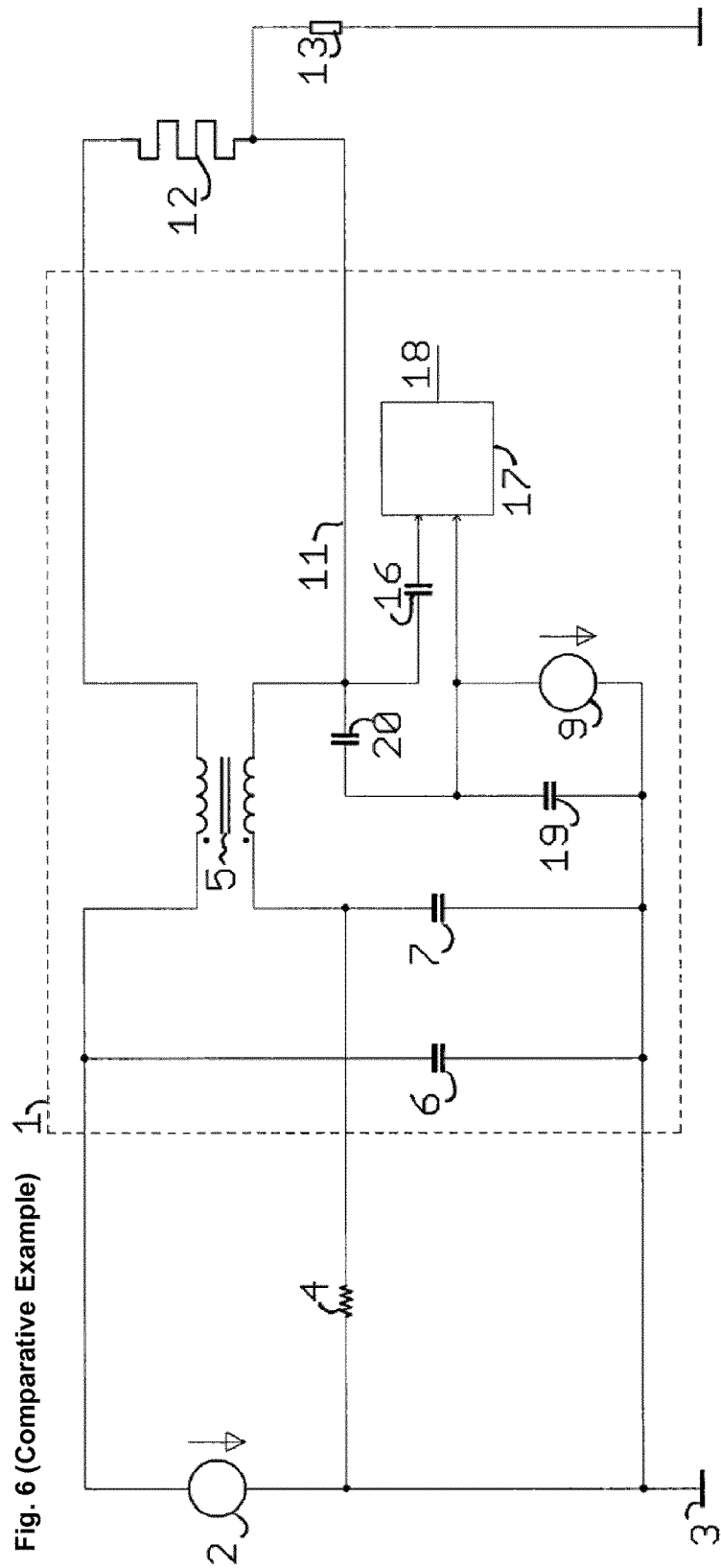
FIG. 6 is a schematic circuit diagram of a combined heating and capacitive sensing system according to a comparative example.

The inductive coupling through the third winding of the common mode choke yields an additional advantage. As briefly indicated hereinabove, in an automotive application, an electronic control module is required to be immune against so-called 'bulk current injection'. The BCI test simulates the influence of electromagnetic fields on the behavior of the electronic control module. A high frequency current is injected into the wiring with a so-called current clamp, and the electronic control module must not substantially deviate from its intended behavior during the test. For the circuit in FIG. 3, this means that a common mode current is for example injected into the connections between voltage source 2 and common mode choke 5. This current will mainly flow through capacitors 6 and 7, through the electronic control module ground into the signal source 9, through transimpedance amplifier 17, capacitor 16 and finally through unknown impedance 13. The problem is that the high frequency current flows out of the signal input 17.2 of the transimpedance amplifier 17 and is thereby superimposed on the measurement current. As the high frequency current has high amplitude (50 mA at 10 MHz for example) and the measurement current is in the order of magnitude of 100 µA, this can lead to a saturation of the transimpedance amplifier 17. One option to mitigate this issue is shown in the comparative example of FIG. 6. Compared to the system of FIG. 3, capacitors 19 and 20 are added in parallel to the AC signal source 9 and the transimpedance amplifier 17, respectively. Instead of totally flowing into the transimpedance amplifier 17, the high frequency test current is divided between capacitor 20 and transimpedance amplifier 17, depending on the ratio of the impedances of capacitor 20 and series connection of capacitor 16 and transimpedance amplifier input impedance. Furthermore, instead of totally flowing into the AC signal source 9, the high frequency test current is divided between capacitor 19 and signal source 9, depending on the ratio of the impedance of capacitor 9 to the output impedance of AC signal source 9. It shall be noted that capacitance 20 cannot be made arbitrarily large, since capacitor 20 will also deviate the current to be measured away from the transimpedance amplifier 17 and thereby reduce the signal to noise ratio of the system.

Figure 7:
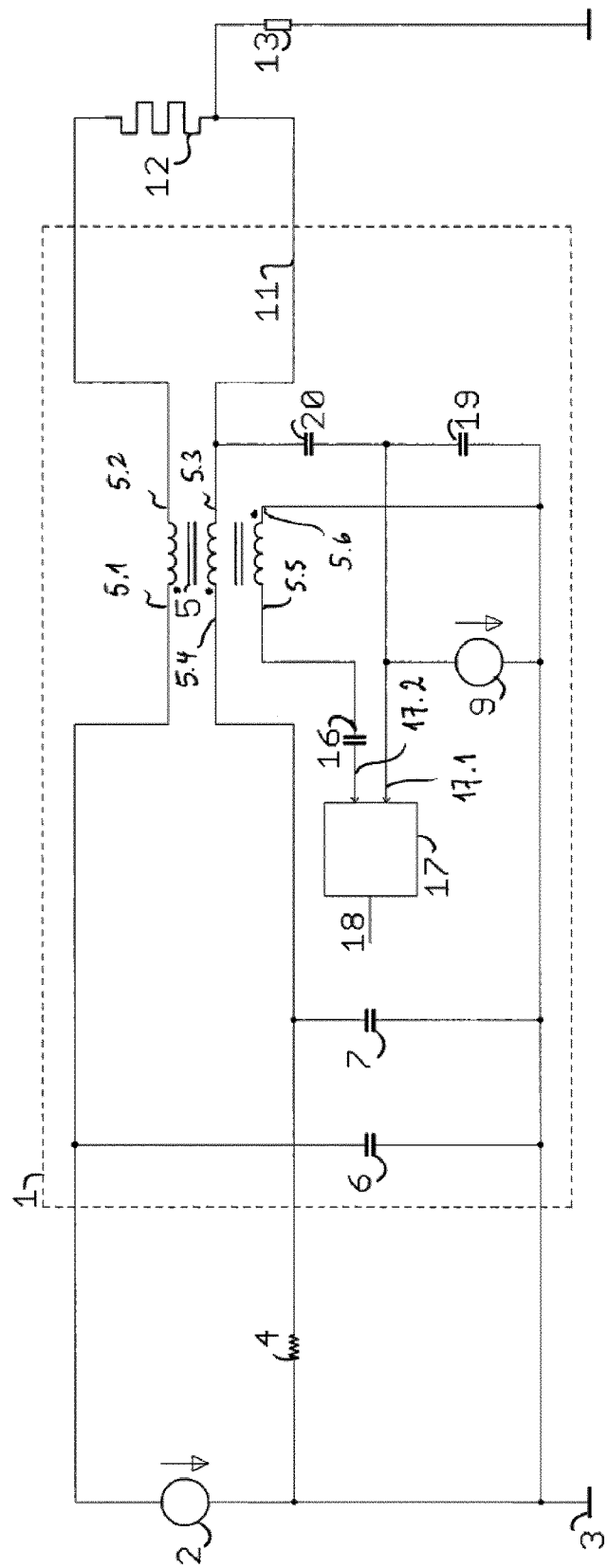
FIG. 7 is a schematic circuit diagram of a combined heating and capacitive sensing system according to a third preferred embodiment of the invention.

The capacitive sensor according to a third embodiment of the invention illustrated in FIG. 7 shows how the third winding described above can alleviate this problem. The circuit is substantially the same as the circuit in FIG. 6, except for the third winding of the common mode choke 5, that inductively couples the measurement node (signal input 17.2) to the heating element 12. The capacitive sensor of FIG. 7 combines the features of the circuits shown in FIGS. 5 and 6. The unknown impedance is determined in the same way as in the circuit of FIG. 5. In the embodiment of FIG. 7, the transformer ratio is 1:1:1 and the senses of winding as well as the directions of connection of the windings are indicated by the winding start dots, in order to obtain identical voltages in amplitude and phase on nodes 11 and 17.1. Indeed, any voltage difference or phase difference between nodes 11 and 17.1, would cause measurement current to be deviated across capacitor 20 (away from the transimpedance amplifier 17.) Contrary to the circuit in FIG. 6, any high frequency test current injected into the wiring between DC voltage source 2 and common mode choke 5 has no direct path into the transimpedance amplifier 17. Substantially all of the high frequency current flows through capacitors 6 and 7, through the electronic control module ground into the paralleled signal source 9 and capacitor 19, through capacitor 20 and finally through unknown impedance 13. There is still a small high frequency current that flows through the first and second common mode choke windings, which causes a current through the third winding due to inductive coupling. For example, assuming a high frequency current having an amplitude of 50 mA at a frequency of 10 MHz, the common mode choke having an inductance of 20 mH, the heating element having a resistance of 1Ω, capacitor 19 having a capacitance of 1 nF, capacitor 20 having capacitance of 10 nF, capacitors 6 and 7 having capacitances of 100 nF, AC signal source 9 having an output impedance of 1Ω, the transimpedance amplifier 17 having an input impedance of 50Ω, the coupling capacitor 16 having a capacitance of 1 µF, the unknown impedance 13 being a capacitance of 100 pF, the common mode choke having a coupling factor of 0.999, and neglecting the capacitive coupling between the common mode windings, the circuit of FIG. 6 yields a high frequency current injection into the transimpedance amplifier 17 of 26 mA, whereas the circuit of FIG. 7 only yields about 430 µA. It follows that the capacitive sensor of FIG. 7 is significantly less prone to fail due to saturation of the transimpedance amplifier 17 than the capacitive sensor according to the comparative example of FIG. 6.

Figure 8:
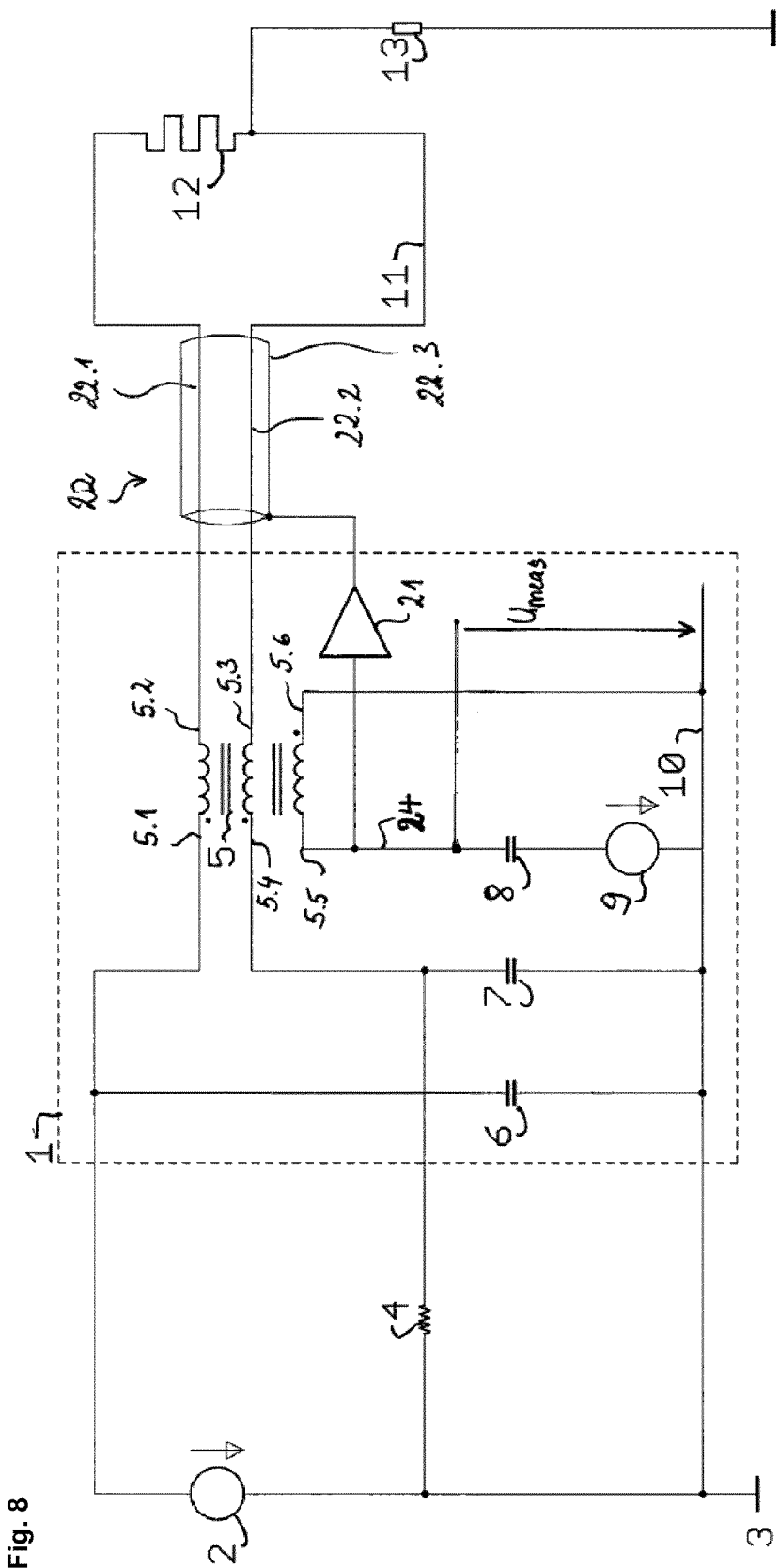
FIG. 8 is a schematic circuit diagram of a combined heating and capacitive sensing system according to a fourth preferred embodiment of the invention.

FIG. 8 illustrates a fourth preferred embodiment of the invention. The capacitive sensor 1 corresponds largely to the one of FIG. 4. In addition, the capacitive sensor of FIG. 8 comprises a shielded cable 22 with a first core conductor 22.1 connected to the first winding and connecting the first winding to the high potential side of said heating element 12, a second core conductor 22.2 connected to the second winding and connecting the second winding to the low potential side of the heating element 12, and a shield conductor 22.3 insulated from and surrounding the first and second core conductors 22.1 and 22.2. The shield conductor 22.3 is connected to an amplifier 21, which receives the AC voltage on the measurement node 24 on its input. The amplifier is adjusted in such a way as to maintain the shield conductor 22.3 at a same AC potential as the first and second core conductors 22.1 and 22.2, whereby the shield conductor 22.3 is operated as a driven shield, which neutralizes the capacitance to ground of at least part of the wiring from the common mode choke 5 to the heating element 12. Indeed, since the shield conductor 22.3 is maintained at the same AC voltage as the core conductors 22.1 and 22.2 both in amplitude and phase, the alternating electric field between the core conductors 22.1 and 22.2 and the shield conductor is substantially cancelled.

If the common mode choke has a transformer ratio of 1:1:1, then the amplifier 21 has unity gain, i.e. it merely buffers the AC voltage onto the shield conductor. However, if the number of turns of the third winding is different from the number of turns of the first and second winding, respectively, then the gain or attenuation (gain <1) of the amplifier 21 has to be chosen different from unity in order to correspond to the transformer ratio between the third and one of the first and the second windings.

Figure 9:
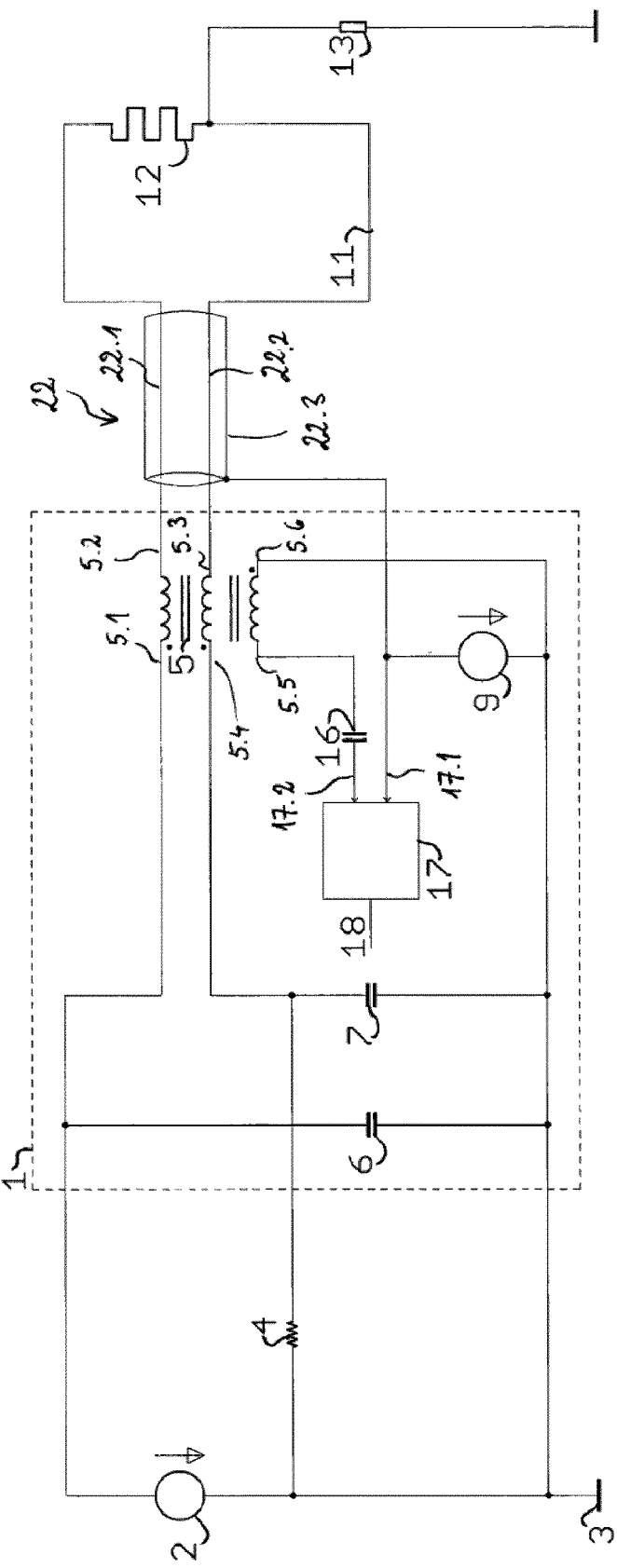
FIG. 9 is a schematic circuit diagram of a combined heating and capacitive sensing system according to a fifth preferred embodiment of the invention.

A fifth preferred embodiment of a capacitive sensor according to the invention is shown in FIG. 9. The capacitive sensor according to the fifth embodiment corresponds to the capacitive sensor according to the second embodiment (FIG. 5), except for the presence of the shielded cable 22 between the common mode choke and the heating element 12. Since the shield conductor 22.3 of the shielded cable 22 is directly connected to the output of the AC voltage source 9, the common mode choke 5 is configured such that it has a transformer ratio of 1:1:1. The sense of winding and the direction of connection of the third winding is furthermore selected such that the AC voltage on the core conductors 22.1 and 22.2 is in phase with the voltage output by the AC voltage source 9.

Figure 10:
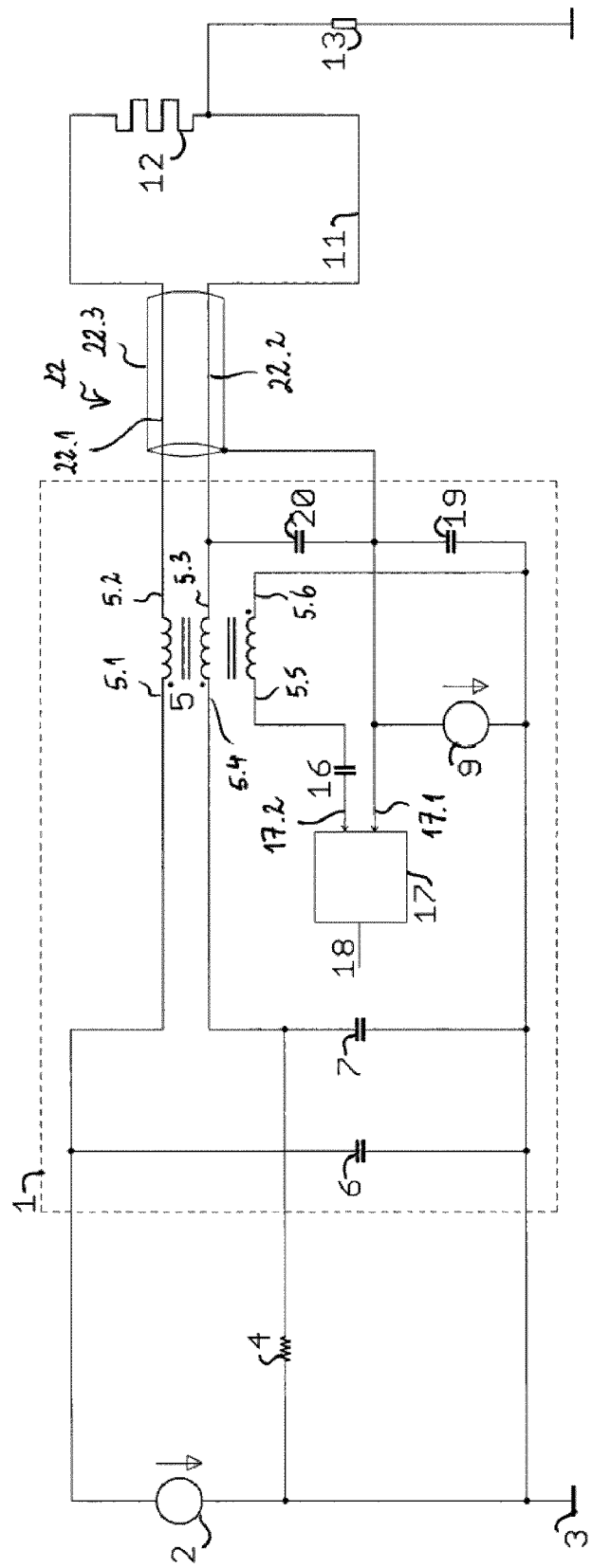
FIG. 10 is a schematic circuit diagram of a combined heating and capacitive sensing system according to a sixth preferred embodiment of the invention.

A sixth preferred embodiment of a capacitive sensor according to the invention is shown in FIG. 10. The embodiment of FIG. 10 largely corresponds to the embodiment of FIG. 9 but additionally comprises a bulk current protection network (including capacitors 19 and 20.) The advantages of the bulk current protection network have been discussed hereinabove with respect to FIG. 7 and need not be repeated here.

Figure 11:
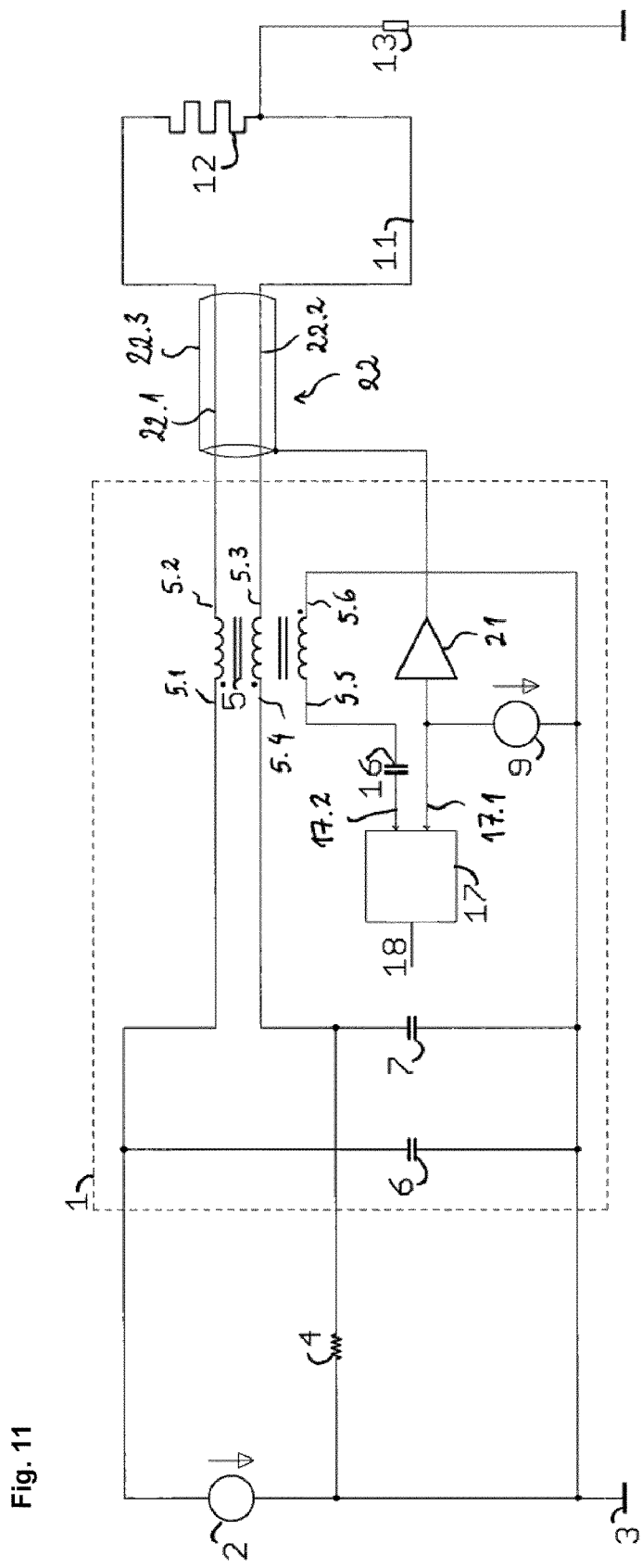
FIG. 11 is a schematic circuit diagram of a combined heating and capacitive sensing system according to a seventh preferred embodiment of the invention.

A seventh preferred embodiment of a capacitive sensor according to the invention is shown in FIG. 11. The embodiment of FIG. 11 largely corresponds to the embodiment of FIG. 9 but additionally comprises an amplifier 21 in order to adjust the amplitude of the AC voltage on the shield conductor 22.3. It will thus be appreciated that in the seventh embodiment of the invention the transformer ratio between the third and the first or second winding may be different from one.

The eighth preferred embodiment of a capacitive sensor according to the invention shown in FIG. 11 combines all the features of the embodiments of FIGS. 10 and 11.

Figure 12:
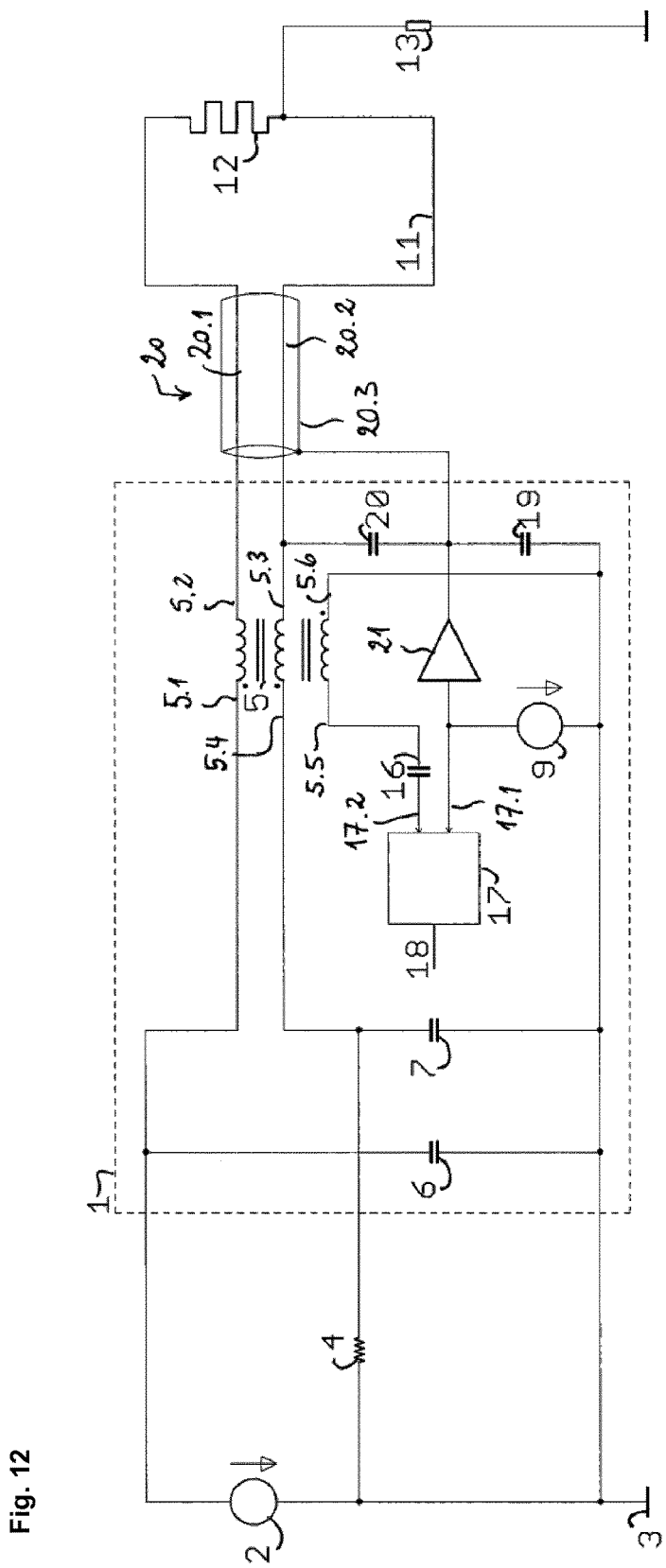
FIG. 12 is a schematic circuit diagram of a combined heating and capacitive sensing system according to an eighth preferred embodiment of the invention.

It is worthwhile noting that in the embodiments of FIGS. 11 and 12, the amplifier 10 could be replaced by an appropriate transformer.

Figure 13:
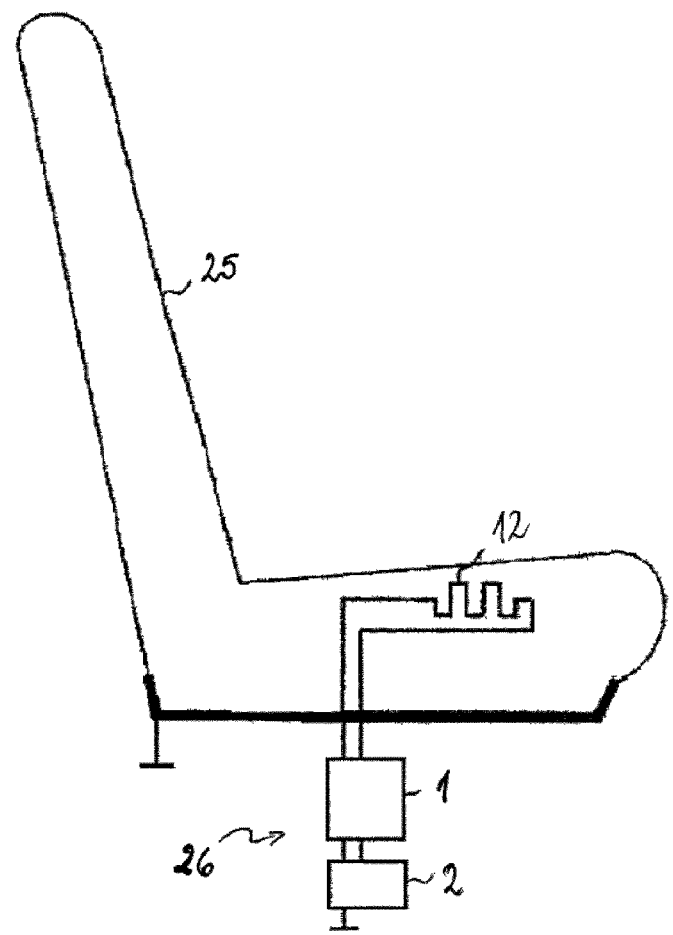
FIG. 13 is a schematic drawing of a vehicle seat comprising a combined heating and capacitive sensing according to the invention.
Figure 14:
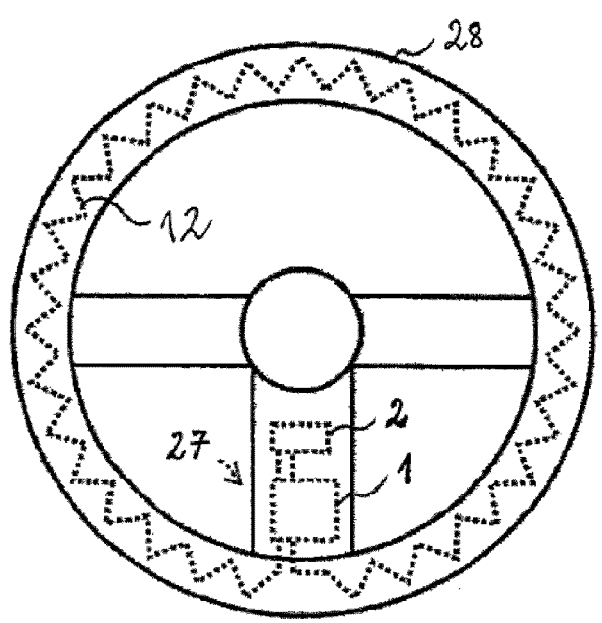
FIG. 14 is a schematic drawing of a steering wheel comprising a combined heating and capacitive sensing according to the invention.

FIG. 13 shows a vehicle seat 25 equipped with a combined seat heating and capacitive occupant sensing system 26. FIG. 14 shows a steering wheel 28 equipped with a combined heating and capacitive hands-on or hands-off sensing system 27.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A capacitive sensor, configured for being connected between a heating element and a heating current supply and for using said heating element as antenna electrode, comprising:
   a common mode choke having first and second inductively coupled windings, said first winding for being connected between a first terminal of said heating current supply and a first terminal of said heating element and said second winding for being connected between a second terminal of said heating element and a second terminal of said heating current supply, said common mode choke further comprising a third winding inductively coupled with said first and second windings; and
   a control and evaluation circuit configured to inject an AC signal into said heating element via a measurement node, to measure a voltage on and/or a current across said measurement node, and to derive an impedance between said heating element and a counter electrode based on said measured voltage and/or current;

wherein said measurement node is operatively coupled to said third winding and galvanically isolated from said heating element, and wherein said AC signal is inductively injected into said heating element through said measurement node and said third winding.

2. The capacitive sensor as claimed in claim 1, wherein said common mode choke comprises a first connection for DC-coupling said first winding to said first terminal of said heating current supply, a second connection for DC-coupling said first winding to said first terminal of said heating element, a third connection for DC-coupling said second winding to said second terminal of said heating element and a fourth connection for DC-coupling said second winding to said second terminal of said heating current supply, and wherein at least one of said first and fourth connections is AC-coupled to a ground conductor.

3. The capacitive sensor as claimed in claim 1, wherein said control and evaluation circuit comprises
 a) a current source coupled to said measurement node, or
 b) an oscillator coupled to said measurement node via an impedor, said impedor comprising at least one of a capacitor, a resistor and an inductor.

4. The capacitive sensor as claimed in claim 3, wherein said control and evaluation circuit is configured to measure the voltage on said measurement node and to derive the impedance between said heating element and a counter electrode from said measured voltage.

5. The capacitive sensor as claimed in claim 1, wherein said control and evaluation circuit comprises an oscillator and a transimpedance amplifier having a reference input, a current signal input and an output, said current signal input being AC-coupled to said measurement node, said oscillator being connected to said reference input for applying an alternating voltage thereto as said AC signal, said transimpedance amplifier being configured to drive a current into said current signal input such that an AC voltage difference between said reference input and said current signal input is substantially cancelled and to output a voltage on said output indicative of said current.

6. The capacitive sensor as claimed in claim 5, comprising a bulk current protection network, including a first bulk current protection capacitor connected between said reference input and a ground conductor and a second bulk current protection capacitor connected between said reference input and a connection of said first or second winding provided for being connected with said heating element.

7. The capacitive sensor as claimed in claim 1, wherein said third winding has a number of turns equal to a number of turns of said first winding and said second winding, respectively.

8. The capacitive sensor as claimed in claim 1, wherein said third winding has a number of turns different from a number of turns of said first winding and said second winding, respectively.

9. The capacitive sensor as claimed in claim 1, further comprising a shielded cable with
 a first core conductor connected to said first winding for connecting said first winding to said first terminal of said heating element,
 a second core conductor connected to said second winding for connecting said second winding to said second terminal of said heating element, and
 a shield conductor surrounding said first and second core conductors, said shield conductor being connected to said control and evaluation circuit, wherein said control and evaluation circuit is configured to maintain said shield conductor at a same AC potential as said first and second core conductors.

10. The capacitive sensor as claimed in claim 9, wherein said shield conductor is connected to said oscillator via an amplifier or a transformer, said amplifier or transformer having a gain corresponding to the ratio of the number of turns of said first or second winding to the number of turns of said third winding.

11. An occupancy sensor for a vehicle seat having a capacitive sensor configured for being connected between a heating element for said vehicle seat and a heating current supply and for using said heating element as antenna electrode, said capacitive sensor comprising:
 a common mode choke having first and second inductively coupled windings, said first winding for being connected between a first terminal of said heating current supply and a first terminal of said heating element and said second winding for being connected between a second terminal of said heating element and a second terminal of said heating current supply, said common mode choke further comprising a third winding inductively coupled with said first and second windings; and
 a control and evaluation circuit configured to inject an AC signal into said heating element via a measurement node, to measure a voltage on and/or a current across said measurement node, and to derive an impedance between said heating element and a counter electrode based on said measured voltage and/or current;
 wherein said measurement node is operatively coupled to said third winding and galvanically isolated from said heating element, and wherein said AC signal is inductively injected into said heating element through said measurement node and said third winding.

12. A hands-on or hands-off detector for a steering wheel having a capacitive sensor configured for being connected between a heating element for said steering wheel and a heating current supply and for using said heating element as antenna electrode, said capacitive sensor comprising:
 a common mode choke having first and second inductively coupled windings, said first winding for being connected between a first terminal of said heating current supply and a first terminal of said heating element and said second winding for being connected between a second terminal of said heating element and a second terminal of said heating current supply, said common mode choke further comprising a third winding inductively coupled with said first and second windings; and
 a control and evaluation circuit configured to inject an AC signal into said heating element via a measurement node, to measure a voltage on and/or a current across said measurement node, and to derive an impedance between said heating element and a counter electrode based on said measured voltage and/or current;
 wherein said measurement node is operatively coupled to said third winding and galvanically isolated from said heating element, and wherein said AC signal is inductively injected into said heating element through said measurement node and said third winding.

* * * * *